US010158693B2

United States Patent
Gartsbein et al.

(10) Patent No.: US 10,158,693 B2
(45) Date of Patent: Dec. 18, 2018

(54) PEER-TO-PEER NETWORK DOWNLOAD OPTIMIZATION

(71) Applicant: VMware, Inc., Palo Alto, CA (US)

(72) Inventors: Anton Gartsbein, Herzliya (IL); Meytal Genah, Herzliya (IL); Dmitry Rabinovich, Herzliya (IL); Chen Doar, Herzliya (IL); Boaz Harel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 381 days.

(21) Appl. No.: 14/712,881

(22) Filed: May 14, 2015

(65) Prior Publication Data

US 2016/0337437 A1 Nov. 17, 2016

(51) Int. Cl.
*G06F 15/16* (2006.01)
*H04L 29/08* (2006.01)

(52) U.S. Cl.
CPC .......... *H04L 67/06* (2013.01); *H04L 67/1076* (2013.01)

(58) Field of Classification Search
CPC ........ H04L 67/06; H04L 67/142; H04L 29/08
USPC ........................................ 709/219
See application file for complete search history.

(56) References Cited

U.S. PATENT DOCUMENTS

| | | | |
|---|---|---|---|
| 2007/0064702 A1* | 3/2007 | Bates ...................... | H04L 45/02 370/392 |
| 2007/0180058 A1* | 8/2007 | Wu ................... | G06F 17/30899 709/219 |
| 2010/0011060 A1* | 1/2010 | Hilterbrand ............... | G06F 8/65 709/204 |
| 2011/0071841 A1* | 3/2011 | Fomenko .......... | G06F 17/30206 705/1.1 |
| 2013/0024680 A1* | 1/2013 | Heidingsfeld .... | G06F 17/30168 713/2 |
| 2014/0122658 A1* | 5/2014 | Haeger ............... | H04L 29/0854 709/219 |

* cited by examiner

*Primary Examiner* — Vivek Srivastava
*Assistant Examiner* — Karina J Garcia-Ching

(57) ABSTRACT

Distributing an update from a server to multiple endpoint devices that reside on the same local network. The server provides information to each client device identifying all other devices located on the same local network that will also need to receive the update. Each client device sorts the files and begins the process of downloading the files by checking, for each file in sequence, whether another device on the same network has downloaded the file or is currently in the process of downloading. If another device on the same network has completed downloading the file, the device requests the file from the other client device. If another device is currently in the process of downloading, the device places the file at the end of the sequence. If the file has not been downloaded and is not being downloaded, the endpoint device initiates downloading the file from the server.

20 Claims, 4 Drawing Sheets

PEER-TO-PEER NETWORK DOWNLOAD OPTIMIZATION

TECHNICAL FIELD

The present disclosure generally relates to content transmission in networked computing environments and more particularly relates to peer-to-peer optimizations that distribute downloading tasks between nodes in the same network within the context of desktop image management.

BACKGROUND

Enterprise desktop image management is one of the most challenging tasks for Information Technology (IT) departments of large organizations today. A typical IT department needs to manage, protect, and distribute software updates and modifications, upgrade operating systems and applications, as well as be able to back up and restore the user's data, applications and settings on demand. One significant issue for IT departments involves the complexity of managing a large number of different desktop instances that exist on the computers of various enterprise users. The sheer number of computers to manage; the proliferation of operating system (OS) images and applications; and the complex set of operations, such as deployment, provisioning, patching, upgrading, installing and managing applications, performing backup and restore operations, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient desktop management without sacrificing end user experience.

One particular difficulty for IT departments arises in situations where a new application or other software update needs to be distributed to a large number of user endpoint devices (e.g., employee laptops). Even if the tools for transmitting such an update from some central location are available, the sheer number of devices and the amount of data to be transferred makes this a challenging task. The administrator and the management console for distributing such updates is often located remotely from the endpoint devices that need to receive the update, meaning that the data transfer needs to happen over a wide area network (WAN) connection. However, transferring large amounts of data over a WAN connection is generally time-consuming and inefficient, and may impact the user experience of a user that is using the device during such updates. All of these inefficiencies are exacerbated when many endpoint devices are involved.

One way to address some of these inefficiencies is to select one endpoint device (sometimes referred to as a "branch reflector") that is located on the same local area network (LAN) as other endpoint devices and designate the selected endpoint device to receive the initial software update (e.g., a new application, operating system update, etc.). After the designated device has completed the download, all other endpoint devices on the same LAN may retrieve the update from the designated device using a substantially more efficient LAN connection. This can improve performance to some extent, however a number of inefficiencies remain with this approach. For example, selecting such a single node for receiving all updates may require a certain amount of manual maintenance/management and may also create a single point of failure for the bandwidth optimization. Additionally, the user experience on the designated node may be impacted when compared to the remaining devices on the LAN. A more efficient technique for distributing software updates and for downloading content in networked environments is needed.

DETAILED DESCRIPTION

Systems and methods in accordance with various embodiments of the present disclosure provide more efficient ways to distribute a set of files, such as an application, operating system update or other content, from a central location (e.g., server) to multiple endpoint devices that reside on the same local network (e.g., subnet, LAN, etc.). When an administrator or other user initiates such an update, the server may provide information to each endpoint client device, identifying all other endpoint devices located on the same local network that will also need to receive the same update. Using this information, each client device can sort the set of files that will need to be downloaded in a particular sequence. In some embodiments, it is advantageous that the sequence of files to be downloaded is randomized or different on each client device; however this is not necessary for all embodiments. Once the files have been sorted, each endpoint device may begin the process of downloading the files by first checking, for each file in order, whether another device on the same network has already downloaded the necessary file or is currently in the process of downloading the necessary file. This information may be obtained by the endpoint device querying other endpoint devices in the same local network to understand which device contains or is downloading which file. If another device on the same local network has already completed the download of the file from the central server, the endpoint device can request the file from the other client device using a LAN connection, thereby reducing the cost and latency of the data transfer. If no other device has completed the download, but another device is currently in the process of downloading the file, the endpoint device can place the file at the end of the sequence (or in some other order in the sequence) on the assumption that it will come back to download this file at a later time, presumably when the other device has had an opportunity to complete the download. If no other device has downloaded the file and no other device is in the process of downloading the file, the endpoint device itself initiates the process of downloading the file from the server and informs the central server after the download has been completed.

The advantages of these embodiments include the elimination of any single point of failure for bandwidth optimizations by making the process more redundant, distributing the workload of downloading the necessary files fairly across all endpoint devices on the same network, and eliminating the need to separately manage and maintain any designated device for downloading the content.

Figure 1:
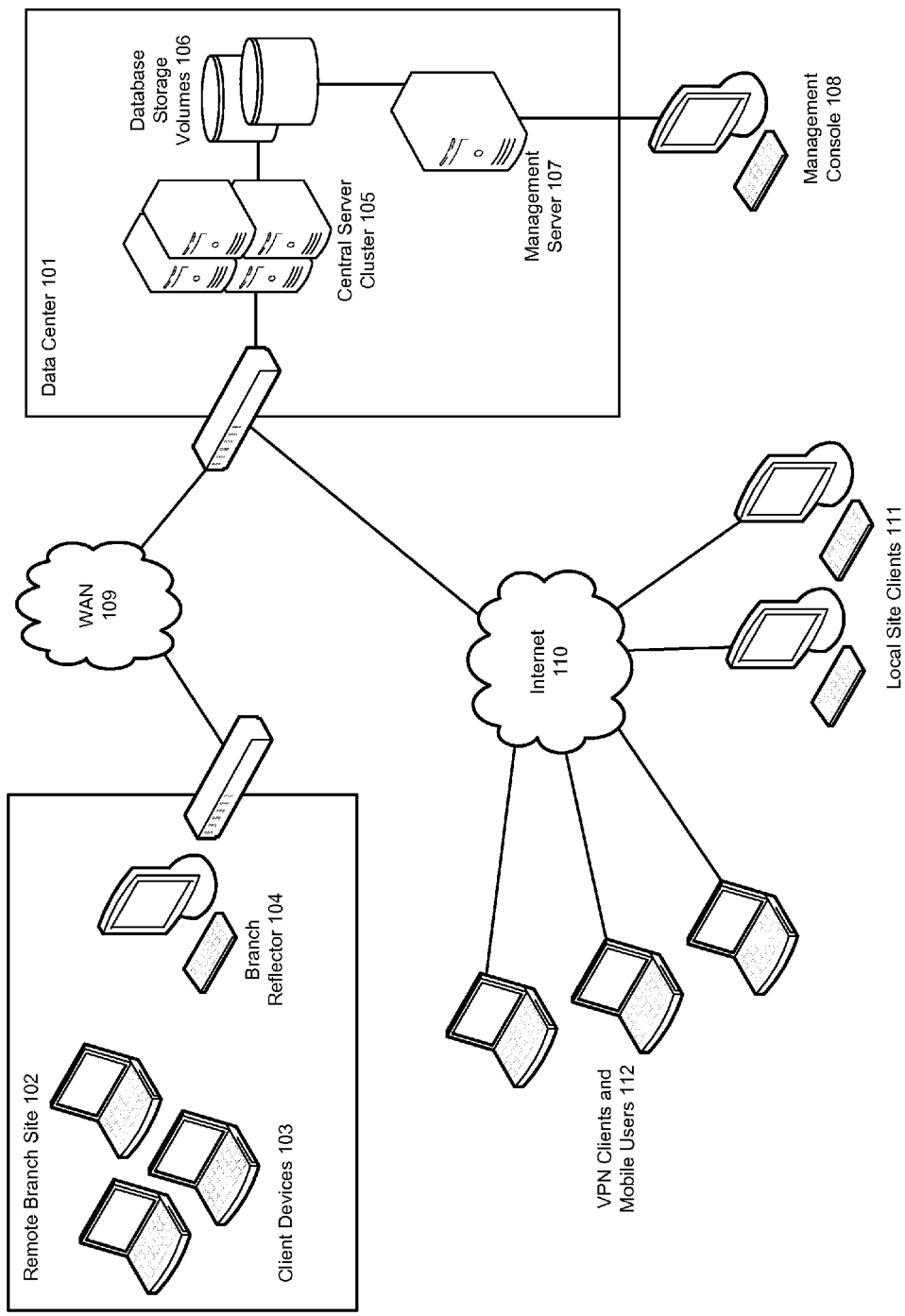
FIG. 1 illustrates an example of desktop image management system in which various embodiments can be implemented.

FIG. 1 illustrates an example of desktop image management system in which various embodiments can be implemented. As illustrated in this example, the system can be used to provide centralized desktop image management in an enterprise setting that includes one or more sites. Generally, the system includes a central server that stores, for each endpoint client device, the entire endpoint image in the data center 101 for management and data replication purposes, and also maintains a number of historical point-in-time snapshots of the endpoint devices based on configured intervals. The deployment of the desktop image management system in the data center 101 may comprised of a management server 107, including a management console 108 that can be accessed by an administrator, a central server cluster 105, and the database and storage volumes 106 that can be used to store a repository of desktop snapshots and image repository, as well as any metadata used for management purposes.

In various embodiments, an agent application and driver are installed on every endpoint device (i.e., client device), including devices at each remote branch site 102, on local site clients 111, and any VPN or mobile clients 112 that might be connected over the Internet 110. The agent generally operates in the background on a client device while the end user is free to use their device. While operating in the background, the agent can perform a number of functions, including backing up an image of all the data of the device to the central server 105 and allowing the central server 105 to distribute any software updates or modifications to the device. This allows an administrator of an IT department to manage the software installed on all employee devices of the organization, while ensuring that no user data is lost.

When the agent is first installed on a client device, it performs an initial centralization process by scanning the contents of the local file system in the client device and uploading any missing files (i.e., files which are not already available on the central server) to the central server 105. Once the centralization process is complete, the central server 105 contains a full image of the user's desktop, including the operating system, applications and user data, all of which can be used to restore the user's device or to make a copy of the device during any data loss events. The central server 105 is responsible for storing the images of all endpoints (i.e., client devices) and for providing an administrator with a management console 108 to manage the various operations (e.g., updates, new software deployments, etc.) on the client devices. The central server 105 stores all the desktop images in a single instance store (SIS) in an efficient manner, using deduplication of the same files or blocks. This helps optimize the storage space and network communications. Once the initial centralization process is complete, the agent can periodically synchronize with the central server any ongoing changes that the user may make to their device.

As mentioned above, the agent can also enable an administrator to use the management console 108 to distribute any changes or software updates to the device, including new applications, operating system updates, or other content. For example, if a new application needs to be installed on multiple endpoint devices, the server can transmit an application layer or "delta" to the endpoint devices. An application delta can contain all of the files and registry entries to install the new application on the device. In one embodiment, the application delta has been produced by first capturing a pre-installation snapshot on a reference machine (e.g., a virtual machine), installing the application on the reference machine, capturing the post-installation snapshot of the reference machine and then recording all of the changes that were made to the file system and registry, which together comprise the application delta. In such embodiments, the application delta can be "merged" onto the endpoint device by writing all of the recorded changes to the endpoint device, without the need to run an interactive installer to install the new application. Thus, when an administrator initiates such an update, the server 105 can distribute the application delta to the agent on the endpoint device and the agent can perform the changes to the device to merge the delta in the background while the user is using their device. As previously described, one or more endpoint devices can be designated to be a branch reflector (BR) 104, which can be used to reduce the wide area network (WAN) 109 bandwidth requirements for image updates by sending the image update only once from the central server 105 to the BR 104 and then propagating the update locally over local area network (LAN) to the other client devices 103 in the branch site 102. However, in various embodiments described herein, the bandwidth optimizations can be further improved by eliminating any designated branch reflectors and by distributing the downloading tasks amongst all of the endpoint client devices in the same local network instead, such as client devices 103 in branch site 102.

It should be noted that, as used throughout this disclosure, the terms "endpoint device" and "client device" are often used interchangeably to mean any computing device having processors and memory and capable of executing various applications, operating systems or the like. Some examples of endpoint devices include employee laptops, personal computers, workstations, smart phones, or tablet computers. In at least some embodiments, the client device can alternatively be a virtual machine that is executed on a host computing device by utilizing a hypervisor, virtual machine manager (VMM) or other virtualization software. In such virtualized embodiments, the agent can be downloaded and installed on a virtual machine or by simply adding the agent to a template for a virtual machine.

Figure 2:
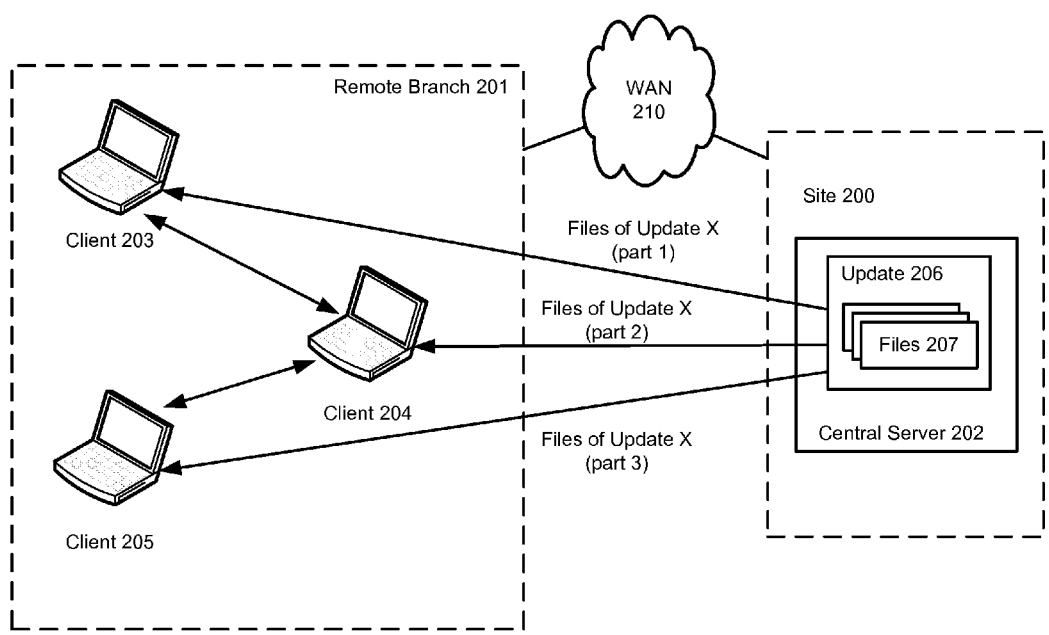
FIG. 2 illustrates an example of peer-to-peer optimization for network download in the desktop image management system, in accordance with various embodiments.

FIG. 2 illustrates an example of peer-to-peer optimization for network download in the desktop image management system, in accordance with various embodiments. In the illustrated example, an administrator selects an update 206 to be distributed to a selected set of client devices, such as clients 203, 204, 205 that are located in a remote branch 201 to which a connection can be made only over a Wide Area Network (WAN) 210, such as the Internet. In one embodiment, the update is a base layer or an application layer. As referred to herein, a "base layer" corresponds to an update or change to the operating system, while an "application layer" corresponds to a change or an update to an application on the endpoint device. The base layer or application layer is composed of a set of files and registry entries 207 which need to be merged on each endpoint for delivery of the captured OS/applications changes. As previously described, the application layer or base layer can be produced by first capturing a pre-installation snapshot on a reference machine (e.g., a virtual machine), installing the application on the reference machine, capturing the post-installation snapshot of the reference machine and then recording all of the changes that were made to the file system and registry, which together comprise the layer. In such embodiments, the application layer or base layer can be "merged" onto the endpoint device by writing all of the recorded changes to the endpoint device, without user interaction.

Once the administrator has initiated the update operation, the clients (203, 204, 205) detect that a base/app layer operation needs to take place. Each client receives the addresses of its peers in the same branch 201 from the server 202 and starts the download process using peer-to-peer (P2P) download process, as described in further detail below. Each client (203, 204, 205) updates the server 202 with progress of the download operation and also updates the server 202 upon completion of the operation. During the distribution of the update, the administrator can track the progress of each client (203, 204, 205) and cancel the operation if the need should arise.

In response to detecting that the update operation is to take place, the client device (e.g., client device 203) requests the peer addresses from the server 202. The server 202 finds all of the clients (e.g., clients 204 and 205) which are located in the same branch 201 with the requesting client 203. In one embodiment, the server 202 finds the clients by reading a pre-defined list of clients in the same branch. In another embodiment, the server finds the client by inspecting the network configuration parameters and identifying all clients in the same subnet as client 203. Once the peer clients have been identified, the server 202 sends the addresses of the found clients to client 203 with some additional data, including (a) indication of online/offline peers and (b) indication of peers receiving the same update as client 203.

In response to receiving this information, the client 203 creates delta-manifest (a list of files which should be downloaded for pending update operation). In on embodiment, the client 203 sorts the downloading list of files to arrange the files in a particular sequence. In some embodiments, it may be advantageous that each client utilize a different order of download or a randomized order. In one embodiment, the files are sorted by the "file distance from peer" metric, as will be described later.

Once the files have been sorted in sequence, the client 203, iterates through the files and for each file, begins by sending a download request for the file to the peers which (a) are online (connected to server 202) and (b) which are downloading the same update (e.g., base layer, application layer, etc.). Thus, for each file, client 203 thus looks for an indication that the file is "located on peer X" (if such an indication exists) or an indication that the file "is being downloaded by peer Y" (if such an indication exists). If client 203 finds the needed file on one of the queried peers or if all of the peers in the branch have been queried, the client 203 can stop the querying process. In some embodiments, there may be a threshold of "peer requests" that is set, in which case, the client 203 may stop querying if the threshold number of peers have been queried. If the file has been completely downloaded by one of the peers, client 203 can download the file from that peer and the file can be marked as being located on that peer. If the file is currently being downloaded by a peer device, client 203 can mark the file as "being downloaded by peer X" and place the file in the end of the list (i.e. at the end of the sequence). If the file has not been downloaded and is not currently being downloaded by any other peer in the branch 201, then client 203 can start the file download from the server 202 and mark the file as "downloaded by client 203." When the download has been completed, the file can be marked as "located on client 203" such that subsequently, any clients in the branch can obtain the file from client 203.

It should be noted that while the process for downloading the file above has been described from the example perspective of client 203, the same process can be carried out by other clients in the branch, such as client 204 and client 205 in parallel or at different times. In some embodiments, because the clients are downloading the files in different orders, the files will complete downloading at different times and each client may begin and end the update process at different times. However, because the clients are able to take advantage of the optimizations in the download process, the tasks to download all files that comprise the update (e.g., layer) is distributed amongst all or the majority of clients (203, 204, 205) in the branch and the overall time taken to distribute the update to all of the clients in the branch is improved. For example, as evident from the illustration in FIG. 2, the task of downloading the set of files that comprise the update is distributed between the peer clients 203, 204, 205, such that each client turns out downloading a portion of the entire set over the remote network connection.

In some embodiments, the order or sequence of downloading the files can be performed according to a distance function. In one particular embodiment, a Data/Peer distance function can be defined as $$D(\text{Data},\text{Peer})=S(S(\text{Data})X \text{ or } S(\text{Peer},\text{Address}))$$

Where S is one way hash function (e.g., the message-digest MD5 algorithm). In this particular implementation, peer A can be said to be "closer" to file F than peer B if $D(F, A) < D(F, B)$ and this property can be used to define the order of downloaded files during the update operation per peer. Thus, each client can arrange the files in the sequence of download by utilizing the distance function. In various embodiments, the hash function need not be limited to MD5 and can utilize other types of cryptographic hash algorithms. It should be noted that it may be advantageous to select a hash function which produces a relatively uniform distribution of hash values, meaning that in a big enough population of files to download (e.g., during a base image update), every client would get close to 1/n part of all files (where n is the number of endpoint devices). This useful to distribute the downloading workload more evenly and to avoid situations where only one or a few devices end up downloading the majority of the content.

Figure 3:
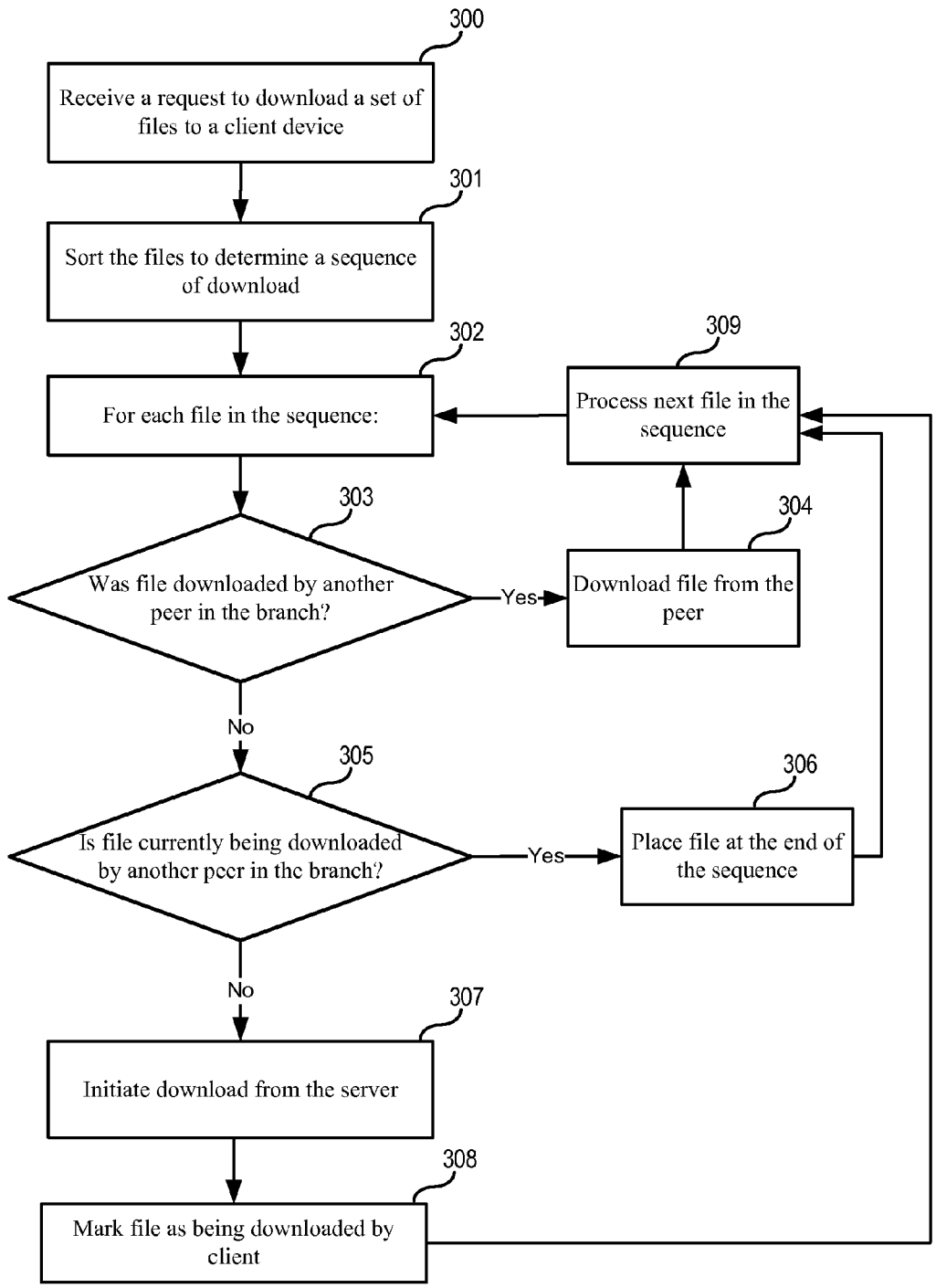
FIG. 3 illustrates an example of a process for peer-to-peer optimization of network download, in accordance with various embodiments.

FIG. 3 illustrates an example of a process for peer-to-peer optimization of network download, in accordance with various embodiments. As shown in operation 300, a request is received to download a set of files to a client device. This request may be initiated by an administrator using a management console of a central server to distribute an update to a plurality of client devices. The update may be an application layer, a base layer or another form of software update. In various embodiments, the client devices are located on the same local network (e.g., LAN, subnet, etc.) while the central server is communicating over a remote connection (e.g., WAN, Internet, etc.). As part of the request, the server may also provide information to the client device, identifying all of the other peer devices in the same local network which will need to receive the same set of files as part of this update.

In operation 301, each client device sorts the files to determine a sequence of downloading the files. In some embodiments, the sequence is randomized between the devices to increase the probability that each device downloads the files in different order. In other embodiments, the order or sequence of downloading the files can be performed according to a distance function, as previously described. In operation 302, the client device then iterates through the sequence of files, attempting to download the file. For each file in the sequence, the client device first determines whether the file was already downloaded by another peer device on the same local network, as shown in operation

303. As previously mentioned, this information may be obtained by the client device querying other devices on the same LAN. If the file has completely been downloaded by another device, the client device can request to download the file from that other peer device that contains the file, as shown in operation 304. Subsequently, the client device can proceed to process the next file in the sequence (operation 309).

If the file has not been downloaded by any peer device on the same local network, the client device can determine whether the file is currently in the process of being downloaded by another peer device on the same network, as shown in operation 305. This information may also be obtained by the client device by querying other devices in the local network. If the client device identifies another peer device that is currently downloading the file, the client device can change the file's order in the sequence, such as by placing it at the end of the sequence, as shown in operation 306, and proceeding with processing the next file in the sequence (operation 309). In this case, the client device would return to process the file after it has processed all other files in the sequence at which time, the peer client device would likely have completed the download of the file and the client device would be able to request the file from the peer device.

If no peer device has downloaded the file and no peer device is currently in the process of downloading the file, the client device can initiate the download process from the server over the remote connection, as shown in operation 307. Once the download process has been started, the file can be marked as being in the process of being downloaded by the client device and the client device can proceed with processing the next file in the sequence (operation 309). Furthermore, once the client device has completed downloading the file, this information may also be marked.

Figure 4:
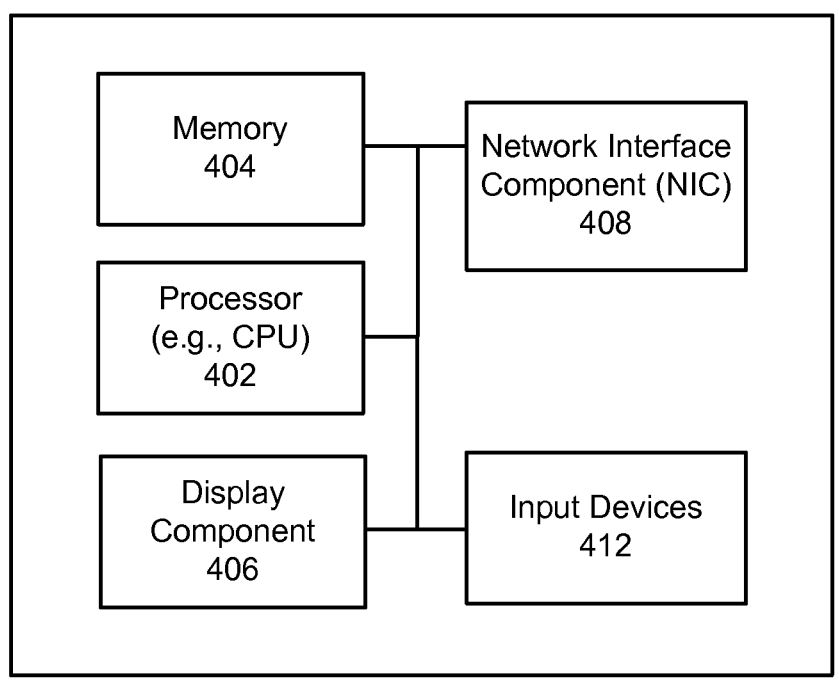
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in physical memory component 404. The memory component 404 can include many types of memory, data storage, or non-transitory computer-readable storage media, such as random access memory (RAM) storing program instructions for execution by the processor 502, a separate form of storage for images or data, a removable memory for sharing information with other devices and the like. The memory component 404 typically can further comprise a display component 406, such as a monitor, a touch screen, liquid crystal display (LCD), or the like. In various embodiments, the computing device will include at least one input device 412 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 408 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for content transmission in networked environments, the method comprising:
    receiving, by an agent executing on a client device, a request to download a set of files from a server to the client device, the client device residing on a local network with a group of peer client devices, the server being connected to the client device via a remote network connection;
    sorting, by the agent, the set of files to be downloaded by the client device to arrange the set of files in a sequence;
    iterating, by the agent, through the sequence of files and, for each file in the sequence,
        determining whether the file has been downloaded by another peer client device in the group and initiating the download of the file from said another peer client device if the file has been downloaded by said another peer client device;
        determining whether the file is currently being downloaded by another peer client device in the group and changing the file's order in the sequence if the file is currently being downloaded by said another peer client device; and
        initiating the download of the file from the server to the client device if the file has not been downloaded and is not currently being downloaded by another peer client device in the group;
    wherein the agent executing on the client device is configured to query other peer client devices on the network during iterating through the sequence of files in order to determine whether the file is currently being downloaded by another peer device in the group.

2. The method of claim 1, wherein changing the file's order in the sequence comprises:
    placing the file at the end of the sequence in response to determining that the file is being currently downloaded by said another peer client device, such that the file will be attempted to be downloaded from said another peer client device at a later time.

3. The method of claim 1, further comprising:
    indicating to the server that the file is being currently downloaded by the client device.

4. The method of claim 1, wherein the server is configured to provide to the client device information identifying the group of peer client devices.

5. The method of claim 1, wherein each client device in the group of peer client devices is configured to download the set of files in a different sequence from remaining client devices in the group.

6. The method of claim 1, wherein the set of files constitutes an application to be installed on the client device, and wherein the group of peer client devices is instructed to also install the application.

7. The method of claim 6, wherein the request to download a set of files is initiated by the server that instructs the client device and the group of peer client devices to install said application.

8. A computing device, comprising:
    at least one processor; and
    memory including instructions that, when executed by the at least one processor, cause the computing device to:
        receive, by an agent executing on the computing device, a request to download a set of files from a server to the computing device, the computing device residing on a local network with a group of peer client devices, the server being connected to the computing device via a remote network connection;
        sort, by the agent, the set of files to be downloaded by the computing device to arrange the set of files in a sequence;
        iterate, by the agent, through the sequence of files and, for each file in the sequence,
            determine whether the file has been downloaded by another peer client device in the group and initiate the download of the file from said another peer client device if the file has been downloaded by said another peer client device;
            determine whether the file is currently being downloaded by another peer client device in the group and change the file's order in the sequence if the file is currently being downloaded by said another peer client device; and
            initiate the download of the file from the server if the file has not been downloaded and is not currently being downloaded by another peer client device in the group;
    wherein the agent executing on the computing device is configured to query other peer client devices on the network during iterating through the sequence of files in order to determine whether the file is currently being downloaded by another peer device in the group.

9. The computing device of claim 8, wherein changing the file's order in the sequence comprises:
    placing the file at the end of the sequence in response to determining that the file is being currently downloaded by said another peer client device, such that the file will be attempted to be downloaded from said another peer client device at a later time.

10. The computing device of claim 8, the memory further including instructions that, when executed by the at least one processor, cause the computing device to:
    indicate to the server that the file is being currently downloaded by the computing device.

11. The computing device of claim 8, wherein the server is configured to provide to the computing device information identifying the group of peer client devices.

12. The computing device of claim 8, wherein each client device in the group of peer client devices is configured to download the set of files in a different sequence from remaining client devices in the group.

13. The computing device of claim 8, wherein the set of files constitutes an application to be installed on the computing device, and wherein the group of peer client devices is instructed to also install the application.

14. The computing device of claim 13, wherein the request to download a set of files is initiated by the server that instructs the computing device and the group of peer client devices to install said application.

15. A non-transitory computer readable storage medium comprising one or more sequences of instructions, the instructions when executed by one or more processors causing the one or more processors to execute the operations of:
receiving, by an agent executing on a client device, a request to download a set of files from a server to the client device, the client device residing on a local network with a group of peer client devices, the server being connected to the client device via a remote network connection;
sorting, by the agent, the set of files to be downloaded by the client device to arrange the set of files in a sequence;
iterating, by the agent, through the sequence of files and, for each file in the sequence,
determining whether the file has been downloaded by another peer client device in the group and initiating the download of the file from said another peer client device if the file has been downloaded by said another peer client device;
determining whether the file is currently being downloaded by another peer client device in the group and changing the file's order in the sequence if the file is currently being downloaded by said another peer client device; and
initiating the download of the file from the server to the client device if the file has not been downloaded and is not currently being downloaded by another peer client device in the group;
wherein the agent executing on the client device is configured to query other peer client devices on the network during iterating through the sequence of files in order to determine whether the file is currently being downloaded by another peer device in the group.

16. The non-transitory computer readable storage medium of claim 15, wherein changing the file's order in the sequence comprises:
placing the file at the end of the sequence in response to determining that the file is being currently downloaded by said another peer client device, such that the file will be attempted to be downloaded from said another peer client device at a later time.

17. The non-transitory computer readable storage medium of claim 15, further comprising instructions executed by one or more processors causing the one or more processors to execute the operation of:
indicating to the server that the file is being currently downloaded by the client device.

18. The non-transitory computer readable storage medium of claim 15, wherein the server is configured to provide to the client device information identifying the group of peer client devices.

19. The non-transitory computer readable storage medium of claim 15, wherein each client device in the group of peer client devices is configured to download the set of files in a different sequence from remaining client devices in the group.

20. The non-transitory computer readable storage medium of claim 15, wherein the set of files constitutes an application to be installed on the client device, and wherein the group of peer client devices is instructed to also install the application.

* * * * *